United States Patent
Perneti et al.

(10) Patent No.: US 11,822,953 B2
(45) Date of Patent: Nov. 21, 2023

(54) MULTI-CRITERIA DECISION ANALYSIS FOR DETERMINING PRIORITIZATION OF VIRTUAL COMPUTING RESOURCES FOR SCHEDULING OPERATIONS

(71) Applicant: Dell Products L.P., Round Rock, TX (US)

(72) Inventors: Jayanth Kumar Reddy Perneti, Bangalore (IN); Vinay Sawal, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 473 days.

(21) Appl. No.: 17/217,111

(22) Filed: Mar. 30, 2021

(65) Prior Publication Data

US 2022/0318041 A1  Oct. 6, 2022

(51) Int. Cl.
*G06F 9/54* (2006.01)
*G06F 9/455* (2018.01)
*G06F 9/50* (2006.01)

(52) U.S. Cl.
CPC ........ *G06F 9/45558* (2013.01); *G06F 9/5005* (2013.01); *G06F 2009/4557* (2013.01)

(58) Field of Classification Search
CPC .... G06F 9/455; G06F 9/45504; G06F 9/5061; G06F 9/5077; G06F 9/50; G06F 9/5005; G06F 9/5011; G06F 9/5027
See application file for complete search history.

(56) References Cited

U.S. PATENT DOCUMENTS 10,452,436 B2 * 10/2019 Kumar ................. G06F 9/5083

OTHER PUBLICATIONS

Wikipedia, "Mahalanobis Distance," https://en.wikipedia.org/wiki/Mahalanobis_distance, Feb. 26, 2021, 4 pages.
Wikipedia, "Topsis," https://en.wikipedia.org/wiki/Topsis, Apr. 13, 2020, 3 pages.
R. Soczewica, "What is Topsis?" https://robertsoczewica.medium.com/what-is-topsis-b05c50b3cd05, Sep. 26, 2020, 5 pages.
VMWARE, Inc. "Dell EMC Avamar 7.5 (52046)" https://kb.vmware.com/s/article/52046, May 11, 2020, 9 pages.
(Continued)

*Primary Examiner* — Andy Ho
(74) *Attorney, Agent, or Firm* — Ryan, Mason & Lewis, LLP

(57) ABSTRACT

An apparatus comprises a processing device configured to select prioritization criteria for a plurality of virtual computing resources and to determine, for at least one criterion in the selected prioritization criteria, at least one directional correlation between the at least one criterion and at least one other criterion in the selected prioritization criteria. The processing device is also configured to generate a prioritization of the plurality of virtual computing resources utilizing a multi-criteria decision analysis algorithm. The multi-criteria decision analysis algorithm is based at least in part on the determined at least one directional correlation. The processing device is further configured to perform one or more scheduling operations for the plurality of virtual computing resources based at least in part on the generated prioritization of the plurality of virtual computing resources.

20 Claims, 23 Drawing Sheets

(56) References Cited

OTHER PUBLICATIONS

Schneider Electric, "PowerChute Network Shutdown," www.apc.com/products/family/index.cfm?id=127, 2019, 4 pages.

M. Velasquez et al., "An Analysis of Multi-Criteria Decision Making Methods," International Journal of Operations Research vol. 10, No. 2, 2013 pp. 56-66.

H. Ghorbani, "Mahalanobis Distance and its Application for Detecting Multivariate Outliers," Facta Universitatis, Series Mathematics and Informatics, vol. 34, No. 3, 2019, pp. 583-595.

Dell EMC, "Dell EMC NetWorker," Version 19.1, VMware Integration Guide 302-005-701 Rev 01, May 2019, 278 pages.

* cited by examiner

DECISION MATRIX
500

| VIRTUAL COMPUTING RESOURCE | DIMENSIONS | | | | | |
|---|---|---|---|---|---|---|
| | $c_1$ | $c_2$ | $c_3$ | $c_4$ | ... | $c_m$ |
| $v_1$ | $x_{11}$ | $x_{12}$ | $x_{13}$ | $x_{14}$ | ... | $x_{1m}$ |
| $v_2$ | $x_{21}$ | $x_{22}$ | $x_{23}$ | $x_{24}$ | ... | $x_{2m}$ |
| $v_3$ | $x_{31}$ | $x_{32}$ | $x_{33}$ | $x_{34}$ | ... | $x_{3m}$ |
| $v_4$ | $x_{41}$ | $x_{42}$ | $x_{43}$ | $x_{44}$ | ... | $x_{4m}$ |
| $v_5$ | $x_{51}$ | $x_{52}$ | $x_{53}$ | $x_{54}$ | ... | $x_{5m}$ |
| $v_6$ | $x_{61}$ | $x_{62}$ | $x_{63}$ | $x_{64}$ | ... | $x_{6m}$ |
| $v_7$ | $x_{71}$ | $x_{72}$ | $x_{73}$ | $x_{74}$ | ... | $x_{7m}$ |
| $v_8$ | $x_{81}$ | $x_{82}$ | $x_{83}$ | $x_{84}$ | ... | $x_{8m}$ |
| ... | ... | ... | ... | ... | ... | ... |
| $v_n$ | $x_{n1}$ | $x_{n2}$ | $x_{n3}$ | $x_{n4}$ | ... | $x_{nm}$ |

FIG. 5

WEIGHT MATRIX 600

| VIRTUAL COMPUTING RESOURCE | DIMENSIONS | | | | | |
|---|---|---|---|---|---|---|
| | $c_1$ | $c_2$ | $c_3$ | $c_4$ | ... | $c_m$ |
| $v_1$ | $w_{11}$ | $w_{12}$ | $w_{13}$ | $w_{14}$ | ... | $w_{1m}$ |
| $v_2$ | $w_{21}$ | $w_{22}$ | $w_{23}$ | $w_{24}$ | ... | $w_{2m}$ |
| $v_3$ | $w_{31}$ | $w_{32}$ | $w_{33}$ | $w_{34}$ | ... | $w_{3m}$ |
| $v_4$ | $w_{41}$ | $w_{42}$ | $w_{43}$ | $w_{44}$ | ... | $w_{4m}$ |
| $v_5$ | $w_{51}$ | $w_{52}$ | $w_{53}$ | $w_{54}$ | ... | $w_{5m}$ |
| $v_6$ | $w_{61}$ | $w_{62}$ | $w_{63}$ | $w_{64}$ | ... | $w_{6m}$ |
| $v_7$ | $w_{71}$ | $w_{72}$ | $w_{73}$ | $w_{74}$ | ... | $w_{7m}$ |
| $v_8$ | $w_{81}$ | $w_{82}$ | $w_{83}$ | $w_{84}$ | ... | $w_{8m}$ |
| ... | ... | ... | ... | ... | ... | ... |
| $v_n$ | $w_{n1}$ | $w_{n2}$ | $w_{n3}$ | $w_{n4}$ | ... | $w_{nm}$ |

FIG. 6

WEIGHTED DECISION MATRIX
700

| VIRTUAL COMPUTING RESOURCE | DIMENSIONS | | | | | |
|---|---|---|---|---|---|---|
| | $c_1$ | $c_2$ | $c_3$ | $c_4$ | ... | $c_m$ |
| $v_1$ | $x_{11}w_{11}$ | $x_{12}w_{12}$ | $x_{13}w_{13}$ | $x_{14}w_{14}$ | ... | $x_{1m}w_{1m}$ |
| $v_2$ | $x_{21}w_{21}$ | $x_{22}w_{22}$ | $x_{23}w_{23}$ | $x_{24}w_{24}$ | ... | $x_{2m}w_{2m}$ |
| $v_3$ | $x_{31}w_{31}$ | $x_{32}w_{32}$ | $x_{33}w_{33}$ | $x_{34}w_{34}$ | ... | $x_{3m}w_{3m}$ |
| $v_4$ | $x_{41}w_{41}$ | $x_{42}w_{42}$ | $x_{43}w_{43}$ | $x_{44}w_{44}$ | ... | $x_{4m}w_{4m}$ |
| $v_5$ | $x_{51}w_{51}$ | $x_{52}w_{52}$ | $x_{53}w_{53}$ | $x_{54}w_{54}$ | ... | $x_{5m}w_{5m}$ |
| $v_6$ | $x_{61}w_{61}$ | $x_{62}w_{62}$ | $x_{63}w_{63}$ | $x_{64}w_{64}$ | ... | $x_{6m}w_{6m}$ |
| $v_7$ | $x_{71}w_{71}$ | $x_{72}w_{72}$ | $x_{73}w_{73}$ | $x_{74}w_{74}$ | ... | $x_{7m}w_{7m}$ |
| $v_8$ | $x_{81}w_{81}$ | $x_{82}w_{82}$ | $x_{83}w_{83}$ | $x_{84}w_{84}$ | ... | $x_{8m}w_{8m}$ |
| ... | ... | ... | ... | ... | ... | ... |
| $v_n$ | $x_{n1}w_{n1}$ | $x_{n2}w_{n2}$ | $x_{n3}w_{n3}$ | $x_{n4}w_{n4}$ | ... | $x_{nm}w_{nm}$ |

FIG. 7

|       | $c_1$        | $c_2$          | $c_3$          | $c_4$          | $c_5$          | ...   | $c_m$          |
|-------|--------------|----------------|----------------|----------------|----------------|-------|----------------|
| $c_1$ | $Var(c_1)$   | $Cov(c_1,c_2)$ | $Cov(c_1,c_3)$ | $Cov(c_1,c_4)$ | $Cov(c_1,c_5)$ | ...   | $Cov(c_1,c_m)$ |
| $c_2$ | $Cov(c_2,c_1)$ | $Var(c_2)$   | $Cov(c_2,c_3)$ | $Cov(c_2,c_4)$ | $Cov(c_2,c_5)$ | ...   | $Cov(c_2,c_m)$ |
| $c_3$ | $Cov(c_3,c_1)$ | $Cov(c_3,c_2)$ | $Var(c_3)$   | $Cov(c_3,c_4)$ | $Cov(c_3,c_5)$ | ...   | $Cov(c_3,c_m)$ |
| $c_4$ | $Cov(c_4,c_1)$ | $Cov(c_4,c_2)$ | $Cov(c_4,c_3)$ | $Var(c_4)$   | $Cov(c_4,c_5)$ | ...   | $Cov(c_4,c_m)$ |
| $c_5$ | $Cov(c_5,c_1)$ | $Cov(c_5,c_2)$ | $Cov(c_5,c_3)$ | $Cov(c_5,c_4)$ | $Var(c_5)$   | ...   | $Cov(c_5,c_m)$ |
| ...   | ...          | ...            | ...            | ...            | ...            | ...   | ...            |
| $c_m$ | $Cov(c_m,c_1)$ | $Cov(c_m,c_2)$ | $Cov(c_m,c_3)$ | $Cov(c_m,c_4)$ | $Cov(c_m,c_5)$ | ...   | $Var(c_m)$   |

COVARIANCE MATRIX 800

FIG. 8

| SORTED RELATIVE CLOSENESS RATING TABLE 1000 | | |
|---|---|---|
| VIRTUAL COMPUTING RESOURCE (ALTERNATIVES) | RELATIVE CLOSENESS ($C^*$) | RANK |
| $v_1$ | $c_1$ | 1 |
| $v_2$ | $c_2$ | 2 |
| $v_3$ | $c_3$ | 3 |
| $v_4$ | $c_4$ | 4 |
| ... | ... | ... |

FIG. 10

VM PRIORITIZATION CRITERIA TABLE 1300

| VM | C1: DAYS SINCE LAST BACKUP | C2: CURRENT STORAGE CONSUMPTION | C3: NUMBER OF APPS INSTALLED | C4: HYPERVISOR HEALTH | ... | CN: PART OF A VM CLUSTER? |
|---|---|---|---|---|---|---|
| VM1 | 3 | 75% | 1 | GREEN | ... | NO |
| VM2 | 0 | 62% | 8 | GREEN | ... | NO |
| VM3 | 4 | 37% | 3 | GREEN | ... | YES |
| VM4 | 1 | 31% | 0 | RED | ... | NO |
| VM5 | 7 | 90% | 3 | YELLOW | ... | YES |
| VM6 | 3 | 48% | 2 | YELLOW | ... | NO |
| VM7 | 2 | 12% | 4 | GREEN | ... | NO |
| VM8 | 1 | 14% | 1 | YELLOW | ... | NO |
| VM9 | 3 | 19% | 5 | GREEN | ... | NO |
| ... | ... | ... | ... | ... | ... | ... |

FIG. 13

TRANSFORMED VM PRIORITIZATION CRITERIA TABLE
1400

| VM | C1: DAYS SINCE LAST BACKUP | C2: CURRENT STORAGE CONSUMPTION | C3: NUMBER OF APPS INSTALLED | C4: HYPERVISOR HEALTH | ... | CN: PART OF A VM CLUSTER? |
|---|---|---|---|---|---|---|
| VM1 | 3 | 75% | 1 | 4 | ... | 0 |
| VM2 | 0 | 62% | 8 | 4 | ... | 0 |
| VM3 | 4 | 37% | 3 | 4 | ... | 1 |
| VM4 | 1 | 31% | 0 | 1 | ... | 0 |
| VM5 | 7 | 90% | 3 | 2 | ... | 1 |
| VM6 | 3 | 48% | 2 | 2 | ... | 0 |
| VM7 | 2 | 12% | 4 | 4 | ... | 0 |
| VM8 | 1 | 14% | 1 | 2 | ... | 0 |
| VM9 | 3 | 19% | 5 | 4 | ... | 0 |
| ... | ... | ... | ... | ... | ... | ... |

FIG. 14

NORMALIZED VM PRIORITIZATION CRITERIA TABLE 1500

| VM | C1: DAYS SINCE LAST BACKUP | C2: CURRENT STORAGE CONSUMPTION | C3: NUMBER OF APPS INSTALLED | C4: HYPERVISOR HEALTH | ... | CN: PART OF A VM CLUSTER? |
|---|---|---|---|---|---|---|
| VM1 | 0.14285 | 0.75000 | 0.07692 | 0.99999 | ... | 0.00001 |
| VM2 | 0.00023 | 0.62000 | 0.61538 | 0.99999 | ... | 0.00001 |
| VM3 | 0.19047 | 0.32000 | 0.23076 | 0.99999 | ... | 0.99999 |
| VM4 | 0.04761 | 0.31000 | 0.00001 | 0.24999 | ... | 0.00001 |
| VM5 | 0.33334 | 0.90000 | 0.23076 | 0.49999 | ... | 0.99999 |
| VM6 | 0.14284 | 0.48000 | 0.15384 | 0.49999 | ... | 0.00001 |
| VM7 | 0.09523 | 0.12000 | 0.30769 | 0.99999 | ... | 0.00001 |
| VM8 | 0.19047 | 0.14000 | 0.07692 | 0.49999 | ... | 0.00001 |
| VM9 | 0.33334 | 0.19000 | 0.38461 | 0.99999 | ... | 0.00001 |
| ... | ... | ... | ... | ... | ... | ... |

FIG. 15

| VM | RELATIVE CLOSENESS ($c^*$) |
|---|---|
| VM1 | 0.63 |
| VM2 | 0.81 |
| VM3 | 0.77 |
| VM4 | 0.79 |
| VM5 | 0.50 |
| VM-6 | 0.89 |
| VM-7 | 0.45 |
| VM-8 | 0.27 |
| VM-9 | 0.38 |
| ... | ... |

RELATIVE CLOSENESS RATING TABLE 1600

FIG. 16

RANKED RELATIVE CLOSENESS RATING TABLE
1700

| VM | RELATIVE CLOSENESS ($C^*$) | RANK |
|---|---|---|
| VM6 | 0.86 | 1 |
| VM2 | 0.81 | 2 |
| VM4 | 0.79 | 3 |
| VM3 | 0.77 | 4 |
| VM1 | 0.63 | 5 |
| VM5 | 0.50 | 6 |
| VM7 | 0.45 | 7 |
| VM9 | 0.38 | 8 |
| VM8 | 0.27 | 9 |
| ... | ... | |

FIG. 17

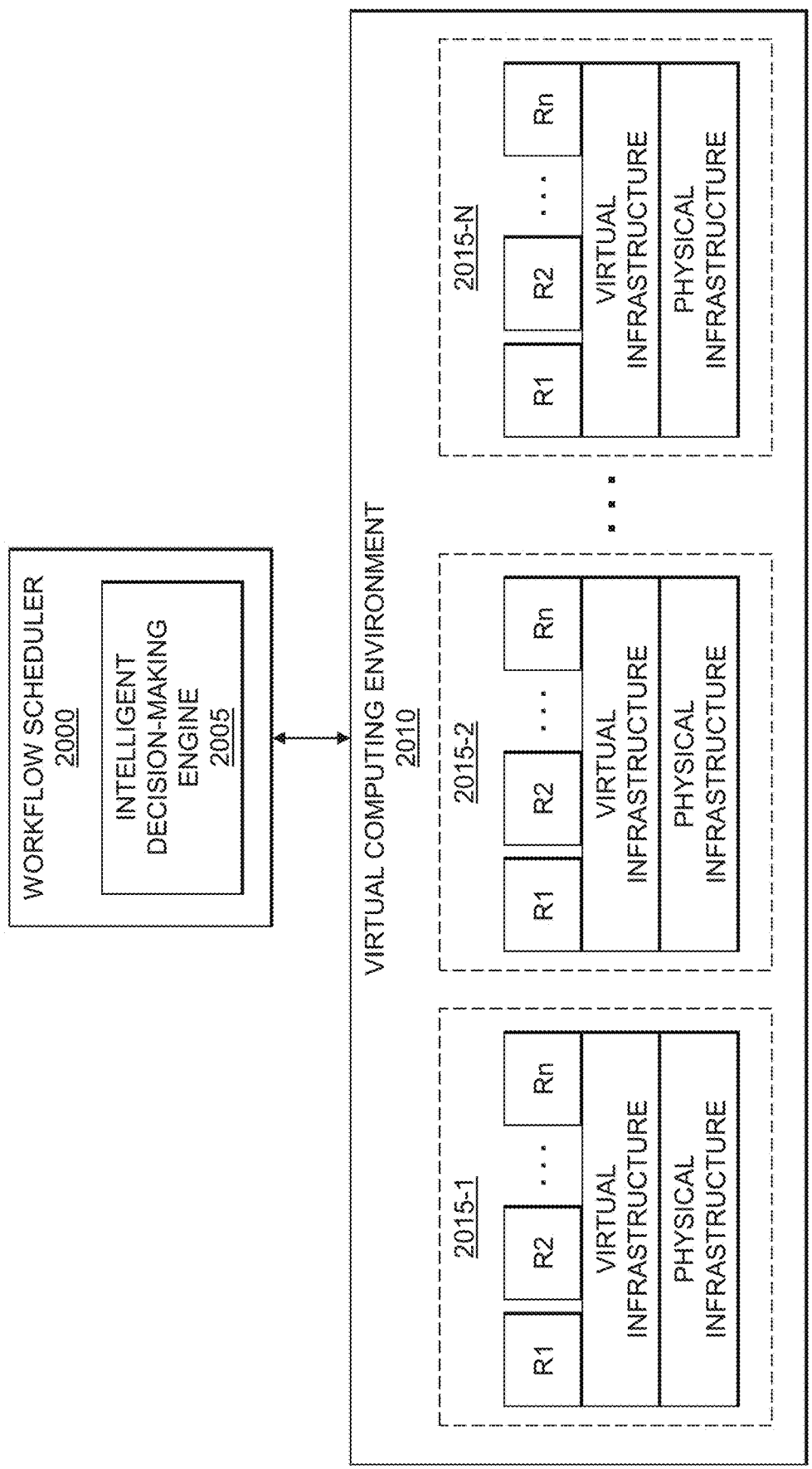

MULTI-CRITERIA DECISION ANALYSIS FOR DETERMINING PRIORITIZATION OF VIRTUAL COMPUTING RESOURCES FOR SCHEDULING OPERATIONS

FIELD

The field relates generally to information processing, and more particularly to scheduling in information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems.

SUMMARY

Illustrative embodiments of the present invention provide techniques for multi-criteria decision analysis for determining prioritization of virtual computing resources for scheduling operations.

In one embodiment, an apparatus comprises at least one processing device comprising a processor coupled to a memory. The at least one processing device is configured to perform the steps of selecting prioritization criteria for a plurality of virtual computing resources and determining, for at least one criterion in the selected prioritization criteria, at least one directional correlation between the at least one criterion and at least one other criterion in the selected prioritization criteria. The at least one processing device is also configured to perform the step of generating a prioritization of the plurality of virtual computing resources utilizing a multi-criteria decision analysis algorithm. The multi-criteria decision analysis algorithm is based at least in part on the determined at least one directional correlation. The at least one processing device is further configured to perform the step of performing one or more scheduling operations for the plurality of virtual computing resources based at least in part on the generated prioritization of the plurality of virtual computing resources.

These and other illustrative embodiments include, without limitation, methods, apparatus, networks, systems and processor-readable storage media.

BRIEF DESCRIPTION OF THE DRAWINGS

FIG. 5 shows a decision matrix for a set of virtual computing resources and multiple criteria in an illustrative embodiment.

FIG. 6 shows a weight matrix for the set of virtual computing resources and multiple criteria in an illustrative embodiment.

FIG. 7 shows a weighted decision matrix for the set of virtual computing resources and multiple criteria in an illustrative embodiment.

FIG. 8 shows a covariance matrix illustrating pair-wise correlations used for evaluating the set of virtual computing resources in an illustrative embodiment.

FIG. 10 shows a sorted relative closeness rating table illustrating relative closeness ratings for the set of virtual computing resources in an illustrative embodiment.

FIG. 13 shows a table of criteria selected for use in prioritization of backup operations involving virtual machines in an illustrative embodiment.

FIG. 14 shows a transformed table of the criteria selected for use in prioritization of backup operations involving virtual machines in an illustrative embodiment.

FIG. 15 shows a normalized table of the criteria selected for use in prioritization of backup operations involving virtual machines in an illustrative embodiment.

FIG. 16 shows a relative closeness rating table illustrating relative closeness ratings for the virtual machines in an illustrative embodiment.

FIG. 17 shows a ranked relative closeness rating table illustrating relative closeness ratings for the virtual machines in an illustrative embodiment.

FIG. 20A shows an intelligent decision-making engine implemented in a workflow scheduler for a virtual computing environment in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
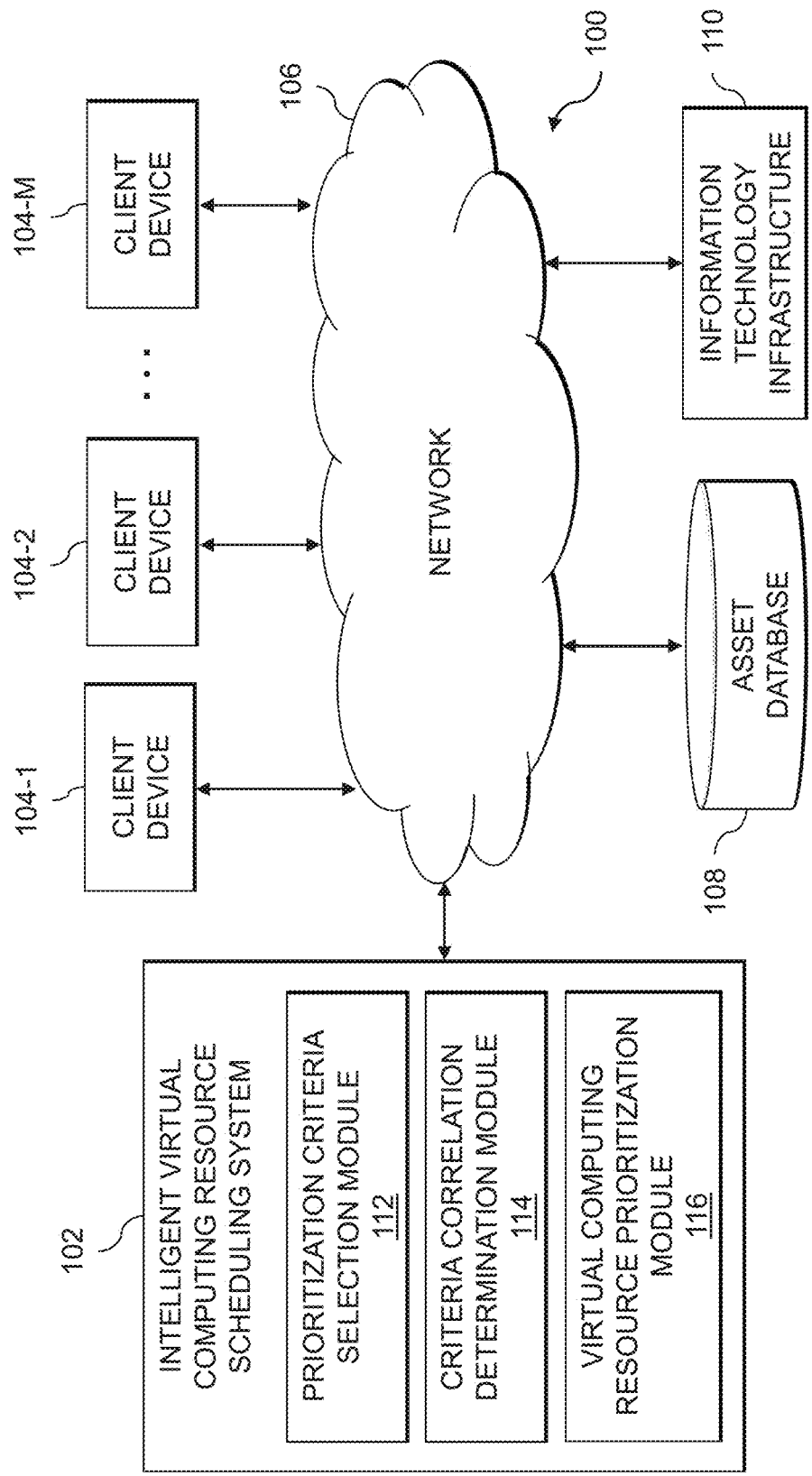
FIG. 1 is a block diagram of an information processing system configured for multi-criteria decision analysis for determining prioritization of virtual computing resources for scheduling operations in an illustrative embodiment of the invention.

FIG. 1 shows an information processing system 100 configured in accordance with an illustrative embodiment. The information processing system 100 is assumed to be built on at least one processing platform and is configured to provide functionality for multi-criteria decision analysis for determining prioritization of virtual computing resources for scheduling operations. The information processing system 100 includes an intelligent virtual computing resource scheduling system 102 and a plurality of client devices 104-1, 104-2, . . . 104-M (collectively client devices 104). The intelligent virtual computing resource scheduling system 102 and client devices 104 are coupled to a network 106. Also coupled to the network 106 is an asset database 108, which may store various information relating to a plurality of assets of information technology (IT) infrastructure 110 also coupled to the network 106. The assets may include, by way of example, physical and virtual computing resources in the IT infrastructure 110. Physical computing resources may include physical hardware such as servers, storage systems, networking equipment, Internet of Things (IoT) devices, other types of processing and computing devices, etc. Virtual computing resources may include virtual machines (VMs), software containers, etc.

In the system 100, the client devices 104 are assumed to be operated by users of the resources or assets of the IT infrastructure 110. For example, the client devices 104 may utilize VMs, containers or other virtual computing resources or other assets in the IT infrastructure 110 for running one or more workloads. The intelligent virtual computing resource scheduling system 102, as will be described in further detail below, is configured to determine a ranking or other prioritization of such virtual computing resources. The ranking or other prioritization of the virtual computing resources is then used by the intelligent virtual computing resource scheduling system 102 to perform one or more scheduling operations involving the virtual computing resources (e.g., scheduling backup or migration operations for the virtual computing resources, scheduling shutdown of the virtual computing resources in response to power interruption events, scheduling tasks or workloads on the virtual computing resources, etc.).

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtual computing resources, such as VMs, software containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The asset database 108, as discussed above, is configured to store and record information relating to various assets of the IT infrastructure 110 that is used by the intelligent virtual computing resource scheduling system 102 in determining a ranking or prioritization of virtual computing resources in the IT infrastructure 110, and for using the determined ranking or prioritization for scheduling operations involved in such virtual computing resources. For example, the asset database 108 may store various information, parameters or other criteria that are used to rank the virtual computing resources of the IT infrastructure 110. Such criteria may include, by way of example, speed, cost, power consumption, load, number of days since a last backup, storage consumption, number and type of applications installed, hypervisor or other virtualization infrastructure health, cluster information, etc. Various other information may be stored in the asset database 108 in other embodiments as discussed in further detail below.

The asset database 108 in some embodiments is implemented using one or more storage systems or devices associated with the intelligent virtual computing resource scheduling system 102. In some embodiments, one or more of the storage systems utilized to implement the asset database 108 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the intelligent virtual computing resource scheduling system 102, as well as to support communication between the intelligent virtual computing resource scheduling system 102 and other related systems and devices not explicitly shown.

The client devices 104 are configured to access or otherwise utilize assets of the IT infrastructure 110 to run workloads. In some embodiments, the assets (e.g., physical and virtual computing resources) of the IT infrastructure 110 are operated by or otherwise associated with one or more companies, businesses, organizations, enterprises, or other entities. For example, in some embodiments the assets of the IT infrastructure 110 may be operated by a single entity, such as in the case of a private data center of a particular company. In other embodiments, the assets of the IT infrastructure 110 may be associated with multiple different entities, such as in the case where the assets of the IT infrastructure 110 provide a cloud computing platform or other data center where resources are shared amongst multiple different entities.

The term "user" herein is intended to be broadly construed so as to encompass numerous arrangements of human, hardware, software or firmware entities, as well as combinations of such entities.

In the present embodiment, alerts or notifications generated by the intelligent virtual computing resource scheduling system 102 are provided over network 106 to client devices 104, or to a system administrator, information technology (IT) manager, or other authorized personnel via one or more host agents. Such host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the intelligent virtual computing resource scheduling system 102. For example, a given host agent may comprise a mobile telephone equipped with a mobile application configured to receive alerts from the intelligent virtual computing resource scheduling system 102 and to provide an interface for the host agent to select actions to take in response to the alert or notification. The alerts, for example, may comprise requests to select prioritization criteria, notifications of proposed scheduling of operations involving virtual computing resources in the IT infrastructure 110, notifications of success or failure of operations involving virtual computing resources in the IT infrastructure 110, etc. The alerts may also or alternatively include proposed rankings or prioritizations of virtual computing resources, which may be modified by end-users.

It should be noted that a "host agent" as this term is generally used herein may comprise an automated entity, such as a software entity running on a processing device. Accordingly, a host agent need not be a human entity.

The intelligent virtual computing resource scheduling system 102 in the FIG. 1 embodiment is assumed to be implemented using at least one processing device. Each such processing device generally comprises at least one processor and an associated memory, and implements one or more functional modules for controlling certain features of the intelligent virtual computing resource scheduling system 102. In the FIG. 1 embodiment, the intelligent virtual computing resource scheduling system 102 comprises a prioritization criteria selection module 112, a criteria correlation determination module 114, and a virtual computing resource prioritization module 116.

The intelligent virtual computing resource scheduling system 102 is configured to receive requests to rank or prioritize a set of virtual computing resources in the IT infrastructure 110. Such a request may be received from one of the client devices 104, or may be generated in response to detection of some type of event involving the set of virtual computing resources in the IT infrastructure 110. For example, the event may be detecting a power interruption event, where the request is for a ranking or prioritization of the set of virtual computing resources running on virtualization infrastructure hosted or implemented by physical infrastructure that has one or more uninterruptable power supply (UPS) devices providing power thereto. The ranking or prioritization in such an example would be utilized to perform an intelligent shutdown of the set of virtual computing resources. As another example, the event may be detecting that a backup or migration operation involving the set of virtual computing resources is to be performed. As a further example, the event may be detecting that workloads are to be scheduled for execution on the set of virtual computing resources. Various other types of events may be detected which can trigger generating or a ranking or prioritization of a set of virtual computing resources in the IT infrastructure 110.

On receiving such a request, the intelligent virtual computing resource scheduling system 102 utilizes the prioritization criteria selection module 112 to select a set of criteria to be used in generating the ranking or prioritization of the set of virtual computing resources. In some embodiments, the prioritization criteria selection module 112 is configured to provide a graphical user interface to a user (e.g., of one of the client devices 104) which includes interface features for selecting which of a plurality of criteria are to be utilized in generating the ranking or prioritization of the set of virtual computing resources. In other embodiments, one or more of the set of criteria may be selected or determined automatically by the prioritization criteria selection module 112, such as based on the type of scheduling operation that the ranking or prioritization of the set of virtual computing resources will be used for. For example, if the ranking or prioritization of the set of virtual computing resources will be used to schedule shutdown of the set of virtual computing resources in response to detecting a power interruption event, criteria reflecting criticality of applications running on the set of virtual computing resources may be automatically selected. As another example, if the ranking or prioritization of the set of virtual computing resources will be used to schedule workloads for execution, criteria reflecting the speed or cost of the set of virtual computing resources may be automatically selected.

The criteria correlation determination module 114 is configured to determine correlations between the selected set of criteria to be used for ranking or prioritizing the set of virtual computing resources. This may include, for example, computing a probability distribution for the selected set of criteria using Mahalanobis distance. A covariance matrix may then be constructed that captures the correlational directionality for the selected set of criteria. The virtual computing resource prioritization module 116 is configured to utilize the determined correlations between the selected set of criteria to generate the ranking or prioritization of the set of virtual computing resources. This may include, for example, computing positive and negative separation measure solutions using the Mahalanobis distance, which gives relative closeness ratings for different ones of the set of virtual computing resources. The set of virtual computing resources may be ordered based on the relative closeness ratings to produce the ranking or prioritization, which is then utilized by the intelligent virtual computing resource scheduling system 102 to perform one or more scheduling operations involving the set of virtual computing resources.

It is to be appreciated that the particular arrangement of the intelligent virtual computing resource scheduling system 102, client devices 104, asset database 108 and IT infrastructure 110 illustrated in the FIG. 1 embodiment is presented by way of example only, and alternative arrangements can be used in other embodiments. For example, the intelligent virtual computing resource scheduling system 102, or one or more portions thereof such as the prioritization criteria selection module 112, the criteria correlation determination module 114, and the virtual computing resource prioritization module 116, may in some embodiments be implemented internal to one or more of the client devices 104 or the IT infrastructure 110. As another example, the functionality associated with the prioritization criteria selection module 112, the criteria correlation determination module 114, and the virtual computing resource prioritization module 116 may be combined into one module, or separated across more than three modules with the multiple modules possibly being implemented with multiple distinct processors or processing devices.

At least portions of the prioritization criteria selection module 112, the criteria correlation determination module 114, and the virtual computing resource prioritization module 116 may be implemented at least in part in the form of software that is stored in memory and executed by a processor.

It is to be understood that the particular set of elements shown in FIG. 1 for multi-criteria decision analysis for determining prioritization of virtual computing resources for scheduling operations is presented by way of illustrative example only, and in other embodiments additional or alternative elements may be used. Thus, another embodiment may include additional or alternative systems, devices and other network entities, as well as different arrangements of modules and other components.

The intelligent virtual computing resource scheduling system 102, and other portions of the system 100, in some embodiments, may be part of cloud infrastructure as will be described in further detail below. The cloud infrastructure hosting the intelligent virtual computing resource scheduling system 102 may also host any combination of the intelligent virtual computing resource scheduling system 102, one or more of the client devices 104, the asset database 108 and the IT infrastructure 110.

The intelligent virtual computing resource scheduling system 102 and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The client devices 104 and the intelligent virtual computing resource scheduling system 102 or components thereof (e.g., the prioritization criteria selection module 112, the criteria correlation determination module 114, and the virtual computing resource prioritization module 116) may be implemented on respective distinct processing platforms, although numerous other arrangements are possible. For example, in some embodiments at least portions of the intelligent virtual computing resource scheduling system 102 and one or more of the client devices 104 are implemented on the same processing platform. A given client device (e.g., 104-1) can therefore be implemented at least in part within at least one processing platform that implements at least a portion of the intelligent virtual computing resource scheduling system 102. Similarly, at least a portion of the intelligent virtual computing resource scheduling system 102 may be implemented at least in part within at least one processing platform that implements at least a portion of the IT infrastructure 110.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the intelligent virtual computing resource scheduling system 102, the client devices 104, the asset database 108 and the IT infrastructure 110, or portions or components thereof, to reside in different data centers. Numerous other distributed implementations are possible. The intelligent virtual computing resource scheduling system 102 can also be implemented in a distributed manner across multiple data centers.

Additional examples of processing platforms utilized to implement the intelligent virtual computing resource scheduling system 102 in illustrative embodiments will be described in more detail below in conjunction with FIGS. 21 and 22.

It is to be appreciated that these and other features of illustrative embodiments are presented by way of example only, and should not be construed as limiting in any way.

Figure 2:
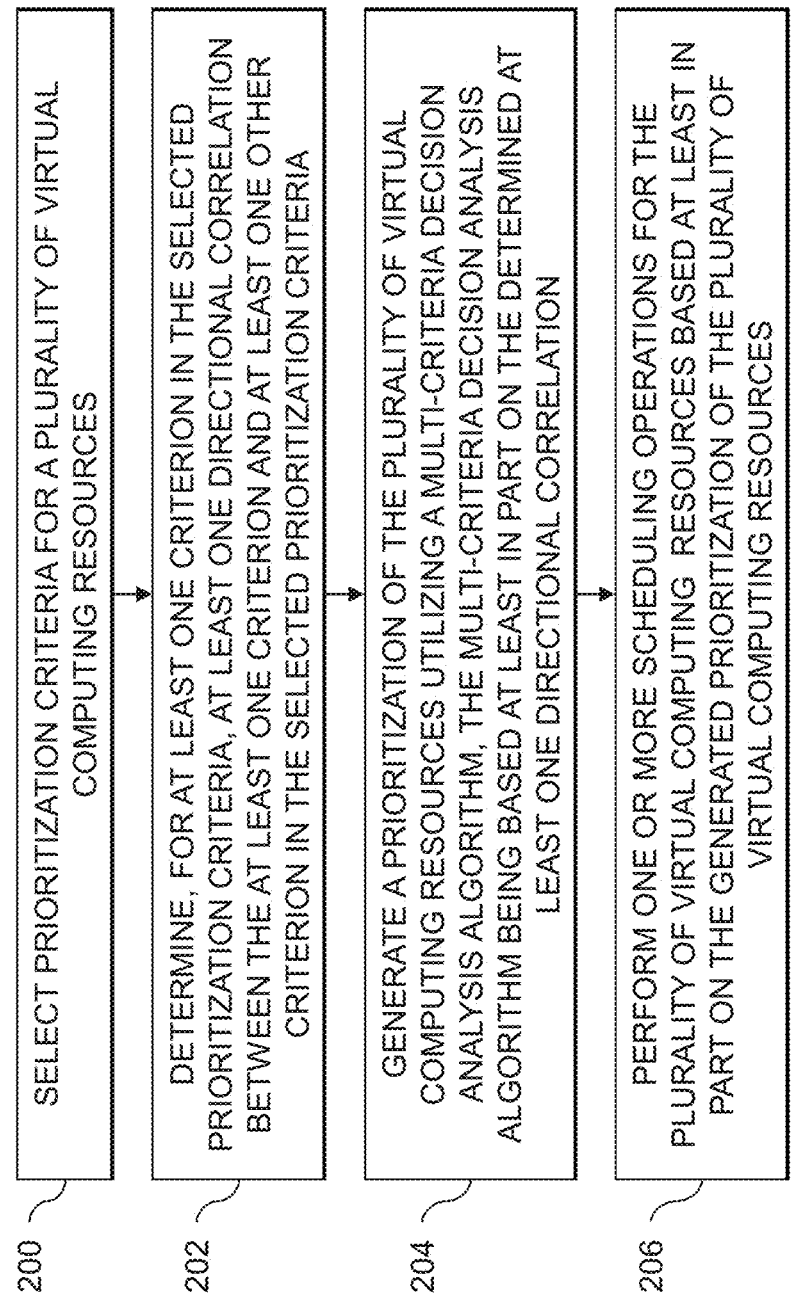
FIG. 2 is a flow diagram of an exemplary process for multi-criteria decision analysis for determining prioritization of virtual computing resources for scheduling operations in an illustrative embodiment.

An exemplary process for multi-criteria decision analysis for determining prioritization of virtual computing resources for scheduling operations will now be described in more detail with reference to the flow diagram of FIG. 2. It is to be understood that this particular process is only an example, and that additional or alternative processes for multi-criteria decision analysis for determining prioritization of virtual computing resources for scheduling operations can be carried out in other embodiments.

In this embodiment, the process includes steps 200 through 206. These steps are assumed to be performed by the intelligent virtual computing resource scheduling system 102 utilizing the prioritization criteria selection module 112, the criteria correlation determination module 114, and the virtual computing resource prioritization module 116. The process begins with step 200, selecting prioritization criteria for a plurality of virtual computing resources. The plurality of virtual computing resources may comprise one or more VMs, one or more software containers, combinations thereof, etc.

The processing continues with step 202, determining, for at least one criterion in the selected prioritization criteria, at least one directional correlation between the at least one criterion and at least one other criterion in the selected prioritization criteria. A prioritization of the plurality of virtual computing resources is generated in step 204 utilizing a multi-criteria decision analysis (MCDA) algorithm. The MCDA algorithm is based at least in part on the determined at least one directional correlation. The MCDA algorithm may comprise a Technique for Order of Preference by Similarity to Ideal Solution (TOPIS) algorithm. One or more scheduling operations for the plurality of virtual computing resources are performed in step 206 based at least in part on the generated prioritization of the plurality of virtual computing resources.

In some embodiments, step 202 comprises constructing a weighted decision matrix. Each element of the weighted decision matrix comprises a value of a given criterion of the selected prioritization criteria for a given one of the plurality of virtual computing resources multiplied by a weight of the given criterion for the given virtual computing resource. The value of the given criterion for the given virtual computing resource may comprise a normalized value. In some embodiments, the given criterion comprises a categorical criterion, and the value of the given criterion for the given virtual computing resource comprises a numeric value obtained by applying a transformation to a categorical value of the categorical criterion. The weight of the given criterion for the given virtual computing resource may be determined based at least in part on an entropy of the value of the given criterion for the given virtual computing resource.

Step 202 may further comprise constructing a covariance matrix, wherein diagonal element values of the covariance matrix comprise variance measures, and wherein non-diagonal element values of the covariance matrix comprise directional covariance measures. Step 202 may also comprise determining positive and negative separation measure solutions for each of the plurality of virtual computing resources, the positive and negative separation measure solutions being determined based at least in part utilizing Mahalanobis distance, the weighted decision matrix, and the covariance matrix, and determining a relative closeness rating for each of the plurality of virtual computing resources based at least in part on the determined positive and negative separation measure solutions for each of the plurality of virtual computing resources. Step 204 may comprise sorting the plurality of virtual computing resources based on the determined relative closeness ratings.

The one or more scheduling operations may be performed in step 206 in response to detecting one or more events. Detecting the one or more events may comprise detecting one or more power interruption events affecting one or more UPS devices associated with physical infrastructure running virtualization infrastructure hosting the plurality of virtual computing resources, and step 206 may comprise determining an ordering for shutdown of the plurality of virtual computing resources following detection of the one or more power interruption events affecting the one or more uninterruptable power supply devices. Detecting the one or more events may comprise detecting one or more power interruption events affecting a first set of one or more UPS devices associated with first physical infrastructure running first virtualization infrastructure hosting the plurality of virtual computing resources, and step 206 may comprise determining an ordering for migration of the plurality of virtual computing resources from the first physical infrastructure running the first virtualization infrastructure to second physical infrastructure running second virtualization infrastructure, the second physical infrastructure being associated with a second set of one or more UPS devices different than the first set of one or more UPS devices.

Detecting the one or more events may alternatively comprise detecting initiation of one or more backup operations for at least one of a virtualization infrastructure hosting the plurality of virtual computing resources and a physical infrastructure on which the virtualization infrastructure runs, and step 206 may comprise determining an ordering for backing up the plurality of virtual computing resources. Detecting the one or more events may alternatively comprise identifying one or more workloads that are to be scheduled, and step 206 may comprise determining placement of the identified one or more workloads on the plurality of virtual computing resources based at least in part on the prioritization of the plurality of virtual computing resources.

As described above, cloud computing continues to grow in popularity. Many organizations have already started using cloud services, as it can provide various benefits including but not limited to ease of management, cost benefits, instant access to a wide variety of services, etc. One important factor in cloud computing or other virtual computing environments is handling virtual computing resources (e.g., virtual machines, software containers, etc.) efficiently and intelligently. Among the factors that fall under the broad category or resource handling is workload scheduling to available virtual computing resources. Selection of a proper workload scheduling technique can provide numerous advantages, enhancing the efficiency of the whole cloud computing system or other virtual computing environment in which the workloads are scheduled.

Virtualization technology has been one of the most influential technologies over the last decade. For example, mainstream adoption of virtualization has only occurred in the last several years, whereas server virtualization itself has been around for longer. Depending on the end-user environment, a virtualization infrastructure may include hundreds or thousands of virtual computing resources. In cloud computing environments, the total number of virtual computing resources may be very high. Various embodiments will be described below in the context of virtual computing environments where the virtual computing resources comprise VMs. It should be appreciated, however, that a virtual computing environment may include various other types of virtual computing resources, such as containers, in addition to or in place of VMs.

Different virtual computing resources, such as VMs, may be used to serve different purposes (e.g., different business purposes based on the needs of the customer or end-user of such VMs). Under certain conditions in some scenarios, it may be beneficial to handle the most important VMs or other virtual computing resources before handling relatively less important VMs or other virtual computing resources. There is thus a need for determining "importance" or other rankings or prioritizations of virtual computing resources. One approach is to have a user manually tag or define a ranking or prioritization of virtual computing resources. Such an approach, however, is by definition highly manual and is difficult to implement particularly in virtual computing environment with large numbers of virtual computing resources. Determining relative importance or prioritization of VMs or other virtual computing resources is thus an important task for various use cases, particularly in large virtualization computing environments including large numbers of VMs or other virtual computing resources. Such use cases include, but are not limited to, prioritization of handling VMs or other virtual computing resources during critical UPS events affecting physical infrastructure on which the virtual computing resources are hosted, task scheduling, backup operations, etc. Conventional approaches to prioritization of handling VMs or other virtual computing resources are mostly manual and trivial approaches, which have several drawbacks and do not provide intelligent prioritization.

Consider, for example, physical infrastructure that utilizes one or more UPS devices. UPS management software may enable performance of an unattended shutdown of servers and workstations that utilize the UPS devices in the event of an extended power outage. In the case of a UPS critical event, such software may perform an unattended system shutdown before the UPS battery is exhausted. The number of protected systems is limited by the capacity of the UPS. Such software, however, does not provide an intelligent method of prioritizing VMs (or other virtual computing resources) to perform various VM operations efficiently during UPS critical events. UPS management software, for example, may allow a user to manually select or place VMs into different categories (e.g., high, medium, low). In a virtual computing environment that includes a large number of VMs (e.g., such as hundreds or thousands of VMs), it would be very difficult and time consuming for an end-user to manually select the order in which VMs should be handled in the event of a critical UPS event.

As another example, consider prioritization of VMs or other virtual computing resources during backup operations. Conventional approaches to handling backup operations may typically handle VMs or other virtual computing resources arbitrarily. When a backup operation triggers as per some defined schedule (e.g., as specified by policy), a backup server processes the VMs for backup operations arbitrarily. Such conventional approaches are inefficient, and do not provide an intelligent approach for choosing a prioritization of VMs for backup operations. In some conventional backup approaches, a backup server may allow a user to select or enable VMs to be processed in alphabetical order during backup. This, however, does not bring intelligence and does not provide an efficient data protection solution. As end-users perform backup operations to protect their data, it may be required to protect important VMs first to provide a meaningful data protection solution. Thus, there is a need for techniques that enable ranking or prioritization of VMs based on various criteria for backup operations.

As a further example, consider prioritization of VMs or other virtual computing resources during task scheduling. One important factor in cloud computing and other virtual computing environments is in handling virtual computing resources (e.g., VMs, containers, etc.) efficiently and intelligently. There are many factors that fall under resource handling. One important factor is task scheduling to available VMs or other virtual computing resources. Conventional approaches fail to handle task scheduling based on multiple parameters.

Illustrative embodiments provide a flexible solution for intelligent VM or other virtual computing resource prioritization based on MCDA. The solutions described herein may be leveraged for any use case that requires or utilizes VM or other virtual computing resource prioritization, including but not limited to handling of VMs or other virtual computing resources during UPS events, backup operations, task scheduling, etc. Advantageously, some embodiments utilize or consider various criteria that can impact the final decision making that produces a ranking or prioritization of VMs or other virtual computing resources. The solutions described herein enable end-users to select criteria of interest on which VM or other virtual computing resource ranking or prioritization may be performed. In some embodiments, the pairwise correlation of criteria is considered to determine an optimal solution (e.g., considering the pairwise correlation of each criterion with each other criterion). Advantageously, the solutions described herein are computationally cheap and efficient compared to conventional approaches. Further, the solutions described herein provide advantages in end-user or customer satisfaction as there is less manual intervention needed to perform VM or other virtual computing resource ranking. Conventional approaches, as noted above, require significant manual effort to select each VM or other virtual computing resource and group them (e.g., into high, medium, low or other categories).

In some embodiments, VM or other virtual computing resource prioritization is modelled as a confidence ranking MCDA based on multiple attributes. The decision space may have finite alternatives. An intelligent decision-making engine is utilized to provide a prioritization or ranking mechanism for VMs or other virtual computing resources. It should be appreciated that different prioritizations or rankings may be generated for different use cases (e.g., for the same set of virtual computing resources, different sets of prioritizations or rankings may be generated for two or more different use cases). Conventional approaches do not provide functionality for addressing the correlation between various VM or other virtual computing resource prioritization criteria using MCDA. To overcome these and other disadvantages of conventional approaches, some embodiments utilize a Mahalanobis distance-based variance-covariance matrix to add correlation directionality in the decision-making algorithm.

Depending on the use case, various criteria which can impact the ranking of VMs or other virtual computing resources can be identified. In some embodiments, various criteria may be presented to end-users via a graphical user interface that permits selection of criteria to be used in generating a ranking or prioritization of virtual computing resources. Based on the use case, an end user can select criteria of interest to that user for that use case (e.g., only those criteria which are defined by the end user are fed to the decision engine and used for VM or other virtual computing resource prioritization tasks).

In some embodiments, a Technique for Order of Preference by Similarity to Ideal Solution (TOPSIS) method is utilized by the intelligent decision-making engine to perform MCDA. Advantageously, the TOPSIS method is suitable for use in high-risk fields and provides stable results. TOPSIS is a weighted criteria aggregation method that compares a set of alternatives (e.g., VMs and other virtual computing resources) to find the distance between each alternative and an ideal alternative. For VM or other virtual computing resource prioritization, there is a strong correlation between prioritization attributes such as: correlation between the type of application installed (e.g., a database application, such as PostgreSQL) and the storage consumption of the VM or other virtual computing resource; correlation between cluster membership and hypervisor health preference; etc. TOPSIS may utilize Euclidean distance to rank alternatives, but this may not take into consideration the correlation between attributes yielding a sub-optimal ranking list or other prioritization. Thus, some embodiments utilize a Mahalanobis distance based variance-covariance matrix to add correlation directionality in the decision making algorithm yielding an optimal solution.

Figure 3:
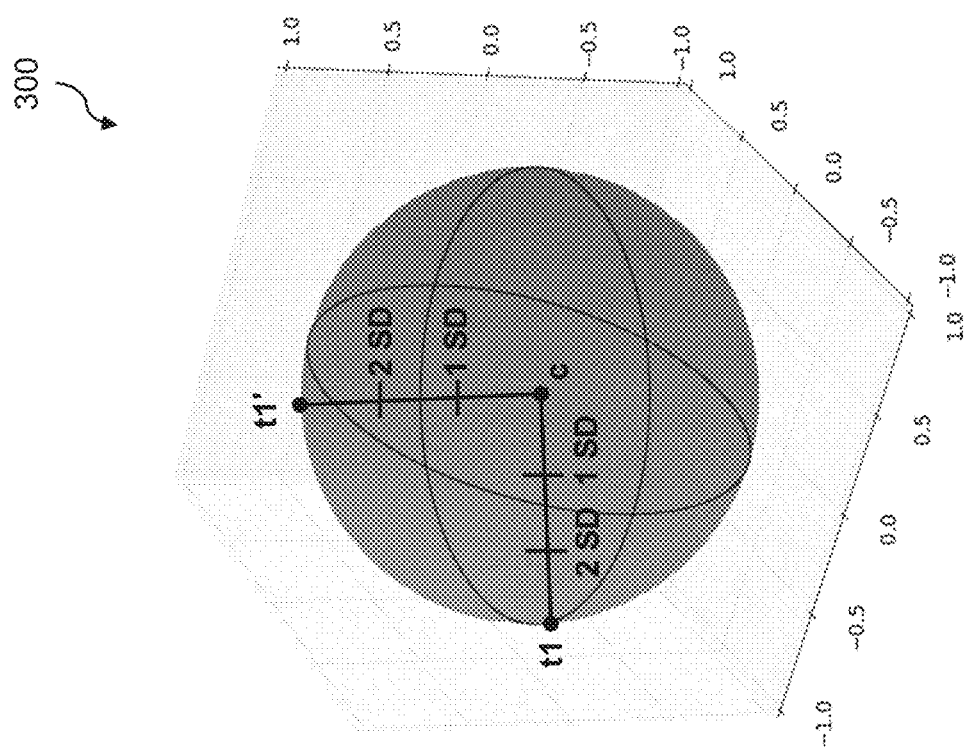
FIG. 3 shows a plot illustrating a probability distribution calculated utilizing Euclidean distance in an illustrative embodiment.

FIG. 3 illustrates a plot 300 showing a probability distribution of sample points calculated using standard deviation in an N-dimensional ($\mathbb{R}^n$) Euclidean space. Standard deviation is used to calculate the probability distribution from the centroid, which is assumed to be spherical. This means that, irrespective of where a test point lies in the Euclidean space, its distance to the centroid (e.g., and hence the probability that the test point lies within a spheroid) does not consider the direction of this point. As illustrated in the plot 300:

$$sd\_dist(t1)=sd\_dist(t1')$$

Euclidean distance thus does not take into account the correlation between various criteria in the data set to calculate the likelihood of the test point being in the distribution.

Figure 4:
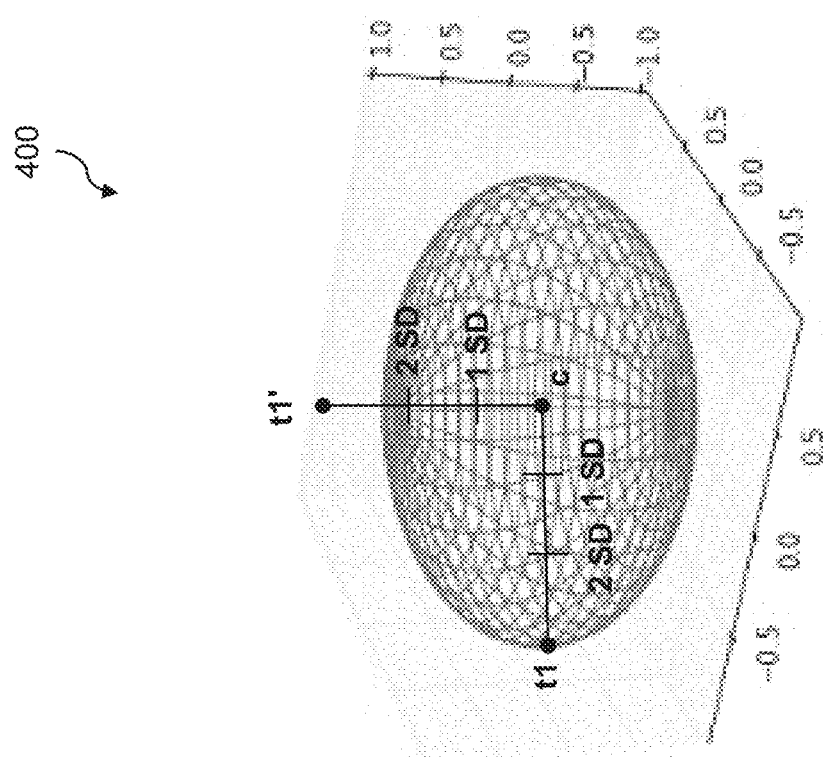
FIG. 4 shows a plot illustrating a probability distribution calculated utilizing Mahalanobis distance in an illustrative embodiment.

FIG. 4 illustrates a plot 400 showing a probability distribution of sample points calculated using Mahalanobis distance, which advantageously does not assume that the sample points are distributed in an N-dimensional ($\mathbb{R}^n$) spherical space about the centroid. By taking into account pair-wise correlation between attributes in the data set, a covariance matrix may be constructed that captures correlational directionality for the data set. This more accurate probability distribution, be it spherical or ellipsoidal, gives the best representation for the data set. As seen in the plot 400, once directionality is considered (e.g., the correlation between criteria), the probability of a test point being in the data set is better estimated:

$$sd\_dist(t1) \neq sd\_dist(t1')$$

An algorithm for determining a prioritization of VMs or other virtual computing resources utilizing a Mahalanobis distance based variance-covariance matrix will now be described. To begin, a decision matrix D is constructed of size $\mathbb{R}^{n \times m}$, where n denotes the number of input VMs or other virtual computing resources and m denotes the number of unique criteria selected for utilization in generating the ranking of prioritization of the n input VMs or other virtual computing resources. FIG. 5 shows an example decision matrix D 500, where the n input VMs or other virtual computing resources and m criteria are variabilized. Next, a weight matrix W is constructed, also of size $\mathbb{R}^{n \times m}$. The weights in the weight matrix W may be determined using an entropy method:

$$W_j = \frac{1 - e_j}{\sum_{j \in n} 1 - e_j}$$

Entropy may be defined as:

$$e_j = -h \sum_{i \in n} (r_{ij} \log_e(r_{ij}))$$

and $$h = \frac{1}{\log_e(r_{ij})}$$

where $r_{ij}$ is the normalized decision matrix. FIG. 6 shows an example weight matrix W 600.

Next, the decision matrix D is multiplied with the weight matrix W to obtain a weighted decision matrix L, also of size $\mathbb{R}^{n \times m}$. This may utilize the entropy method:

$$L = D \times W$$

FIG. 7 shows an example of a weighted decision matrix L 700. A covariance matrix V of size $\mathbb{R}^{m \times m}$ is then constructed, where elements of the covariance matrix V represent the pairwise correlation between the two criterion. For example, correlation between $c_1$ and $c_2$ is represented as $Cov(c_1, c_2)$. Diagonal elements in the covariance matrix V represent variance for the given criterion, $Var(c_1)$. FIG. 8 shows an example of a covariance matrix V 800.

Using the weighted decision matrix L, a positive ideal solution $A^+$ (e.g., representing the best alternative) and a negative ideal solution $A^-$ (e.g., representing the worst alternative) are determined. Using Mahalanobis distance, a positive separation measure solution $S_i^+$ and a negative separation solution $S_i^-$ are computed for all alternatives:

$$S_i^+ = \sqrt{(A_i - A^+) \cdot W^T \cdot V^{-1} \cdot W \cdot (A_i - A^+)}$$

$$S_i^- = \sqrt{(A_i - A^-) \cdot W^T \cdot V^{-1} \cdot W \cdot (A_i - A^-)}$$

where $A_i$ represents all possible alternatives i=1, 2, ... n, W represents the diagonal weight matrix, $W^T$ represents the transpose of the diagonal weight matrix, and $V^{-1}$ represents the inverse of the covariance matrix. Using the positive separation measure solutions $S_i^+$ and negative separation measure solutions $S_i^-$, the relative closeness $C^*_i$ of the ideal solution for every alternate is calculated as follows:

$$C_i^* = \frac{S_i^-}{S_i^- + S_i^+}$$

Figure 9:
FIG. 9 shows a relative closeness rating table illustrating relative closeness ratings for the set of virtual computing resources in an illustrative embodiment.

The relative closeness rating $C^*_i$ is a real valued number between 0 and 1 (i.e., $C^*_i \in \{0, 1\}$), with 1 representing the best alternative and 0 representing the worst alternative. FIG. 9 shows a relative closeness rating table 900 for alternatives $v_1, v_2, v_3, v_4, \ldots v_n$. The alternatives list can then be sorted based on relative closeness, to produce a sorted relative closeness rating table 1000 as shown in FIG. 10. The sorted relative closeness rating table 1000 may be used to pick the best or top k alternatives for further processing.

Figure 11:
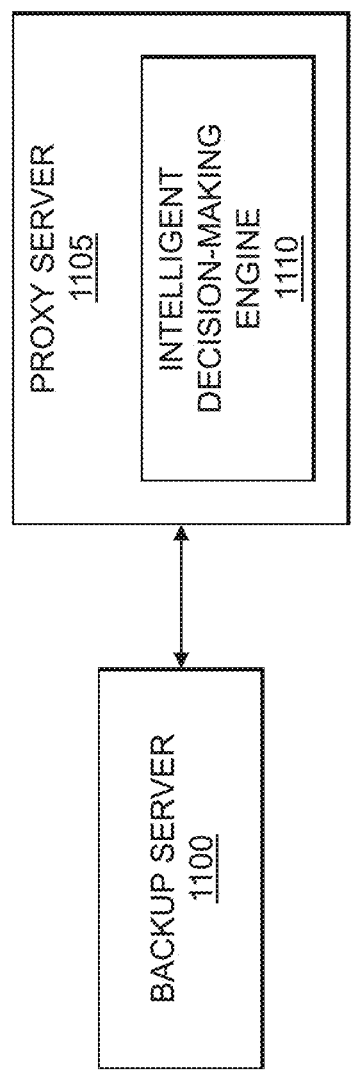
FIG. 11 shows an intelligent decision-making engine implemented in a proxy server coupled to a backup server of a backup environment in an illustrative embodiment.

Application of the above-described algorithm in various use case scenarios will now be described. FIG. 11, for example, illustrates a use case of VM or other virtual computing resource prioritization during backup operations. FIG. 11 shows a backup server 1100, which is in communication with a proxy server 1105 (e.g., a Dell EMC Avamar or NetWorker proxy) on which an intelligent decision-making engine 1110 is embedded. The intelligent decision-making engine 1110 is configured to implement an algorithm for prioritizing VMs or other virtual computing resources during backup operations performed by the backup server 1100.

In a backup ecosystem or environment, various criteria that may be used to define VM or other virtual computing resource prioritization can be identified. In some embodiments, such criteria may be identified by connecting with end-user, customer or account teams. Various examples of such criteria will now be described. One criteria is the number of days since the last backup operation of a VM or other virtual computing resource. If the number of days since the last backup operation performed for a given VM or other virtual computing resource is more than one or more other ones of the VMs or other virtual computing resources, then the given VM or other virtual computing resource can be prioritized for backup operations as it is more important to protect the given VM or other virtual computing resource relative to the one or more other ones of the VMs or other virtual computing resources. Another criteria is the current storage consumption of a VM or other virtual computing resource. The current storage consumption may be an important criteria for prioritizing VMs or other virtual computing resources. If a given VM or other virtual computing resource is 90% full which is more than one or more other ones of the VMs or other virtual computing resources, then the given VM or other virtual computing resource can be prioritized for data protection relative to the one or more other ones of the VMs or other virtual computing resources. The customer or end-user can also be notified to free up space proactively to counter storage getting full on the given VM or other virtual computing resource.

A further criteria is the number and/or type of applications installed on a VM or other virtual computing resource. If there are applications installed on a given VM or other virtual computing resource such as database applications, then the given VM or other virtual computing resource can be prioritized for a data protection operation to help protect mission critical or business critical data first. The applications installed on the given VM or other virtual computing resource can be easily identified by using scripts embedded into the intelligent decision-making engine 1110, or using third-party tools or APIs (e.g., "manageengine.com"). Another criteria is the health of the underling virtualization infrastructure (e.g., a hypervisor such as ESXi) on which VMs or other virtual computing resources are hosted. If the underlying virtualization infrastructure (e.g., a VMware ESXi™ hypervisor) is in poor health, then VMs or other virtual computing resources hosted on that virtualization infrastructure can be prioritized for data protection operations. There may be various factors affecting virtualization infrastructure health. Consider, as an example, an ESXi hypervisor were factors affecting ESXi health may include CPU usage, RAM usage, disk health, datastore usage, etc. The health of the underlying ESXi hypervisor or other virtualization infrastructure may be obtained using monitoring tools provided by a vendor of the virtualization software used by the virtualization infrastructure. For example, "Skyline health" gives complete health details of a VMware vCenter® environment by running health checks on each ESXi hypervisor in the vCenter deployment. There may be several health checks performed by the monitoring tools to determine the health, and hence the number of health checks passed can be taken as a unit of measurement. Another criteria that may be considered is determining whether VMs or other virtual computing resources are part of a cluster of VMs or other virtual computing resources, where correlations between the VMs or other virtual computing resources in such clusters may be taken into account.

Figure 12:
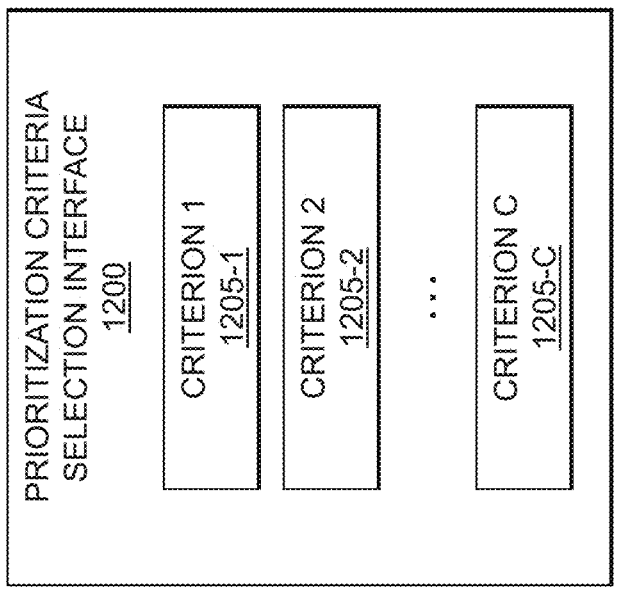
FIG. 12 shows a prioritization criteria selection interface in an illustrative embodiment.

Various criteria, including one or more of the above-described criteria, may be provided to an end-user for selection via a criteria selection interface such as the prioritization criteria selection interface 1200 shown in FIG. 12. The prioritization criteria selection interface 1200 includes interface features enabling the end-user to select which of the criteria 1205-1, 1205-2, . . . 1205-C (collectively, criteria 1205) should be used for VM or other virtual resource prioritization. The intelligent decision-making engine 1110 will then perform VM or other virtual resource prioritization for backup operations or tasks based on the criteria selected by the end-user via the prioritization criteria selection interface 1200.

Using the criteria selection input, a VM prioritization criteria table 1300 as shown in FIG. 13 is created, with rows representing VMs (e.g., an example of virtual computing resources) and columns as the criteria selected by the end-user. The VMs in the table 1300 may also be referred to as alternatives. FIG. 14 shows a transformed VM prioritization criteria table 1400, where categorical (e.g., nominal, ordinal, etc.) criteria are converted into numeric features. In the example of FIG. 14, the criteria C4 (ESXi hypervisor or other virtualization infrastructure health) and Cn (whether a VM is part of a VM cluster) are converted into numeric features using label encoders and one-hot vector encoders. FIG. 15 shows a normalized VM prioritization criteria table 1500, where the data for each criteria is normalized (e.g., using various techniques such as unity-base, linear, vector, etc.). A relative closeness rating table 1600 is then produced as shown in FIG. 16, which may then be sorted to produce the ranked relative closeness rating table 1700 shown in FIG. 17.

Figure 18:
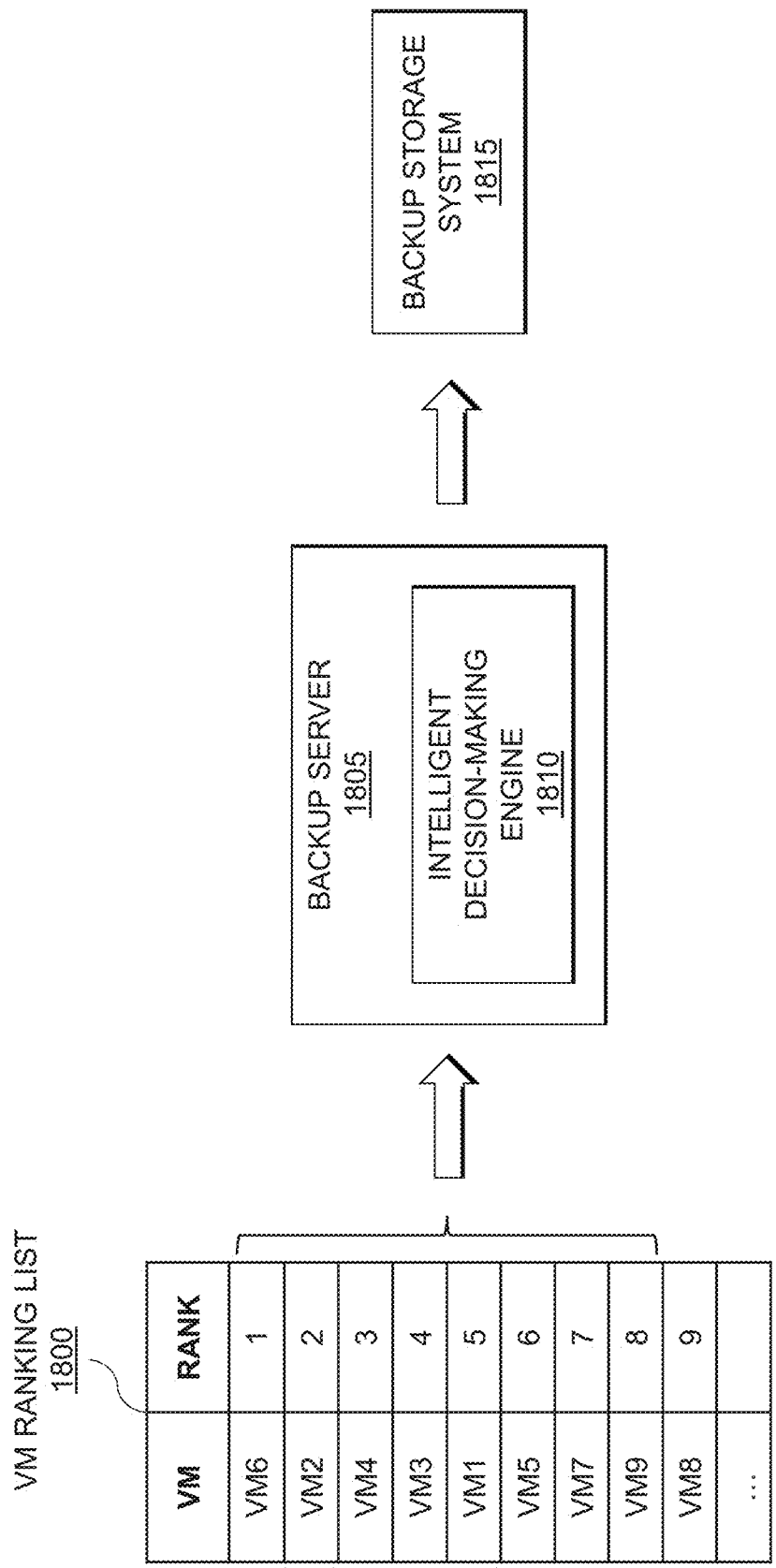
FIG. 18 shows a virtual machine ranking list that is used in performing backup operations for a backup environment in an illustrative embodiment.

FIG. 18 illustrates backup operations performed using a VM ranking list 1800, which may be obtained from the ranked relative closeness rating table 1700. Based on the final VM ranking list 1800, VMs are now picked in order by the intelligent decision-making engine 1810 embedded on a backup server 1805 (e.g., Avamar) for backup to a backup storage system 1815 (e.g., a Dell EMC Data Domain system). Consider, as an example, that the backup server 1805 deploys a single proxy server that is capable of running 8 VM backup operations in parallel. In this example, the top 8 ranked VMs in the VM ranking list 1800 are picked for backup and the rest are queued.

Figure 19:
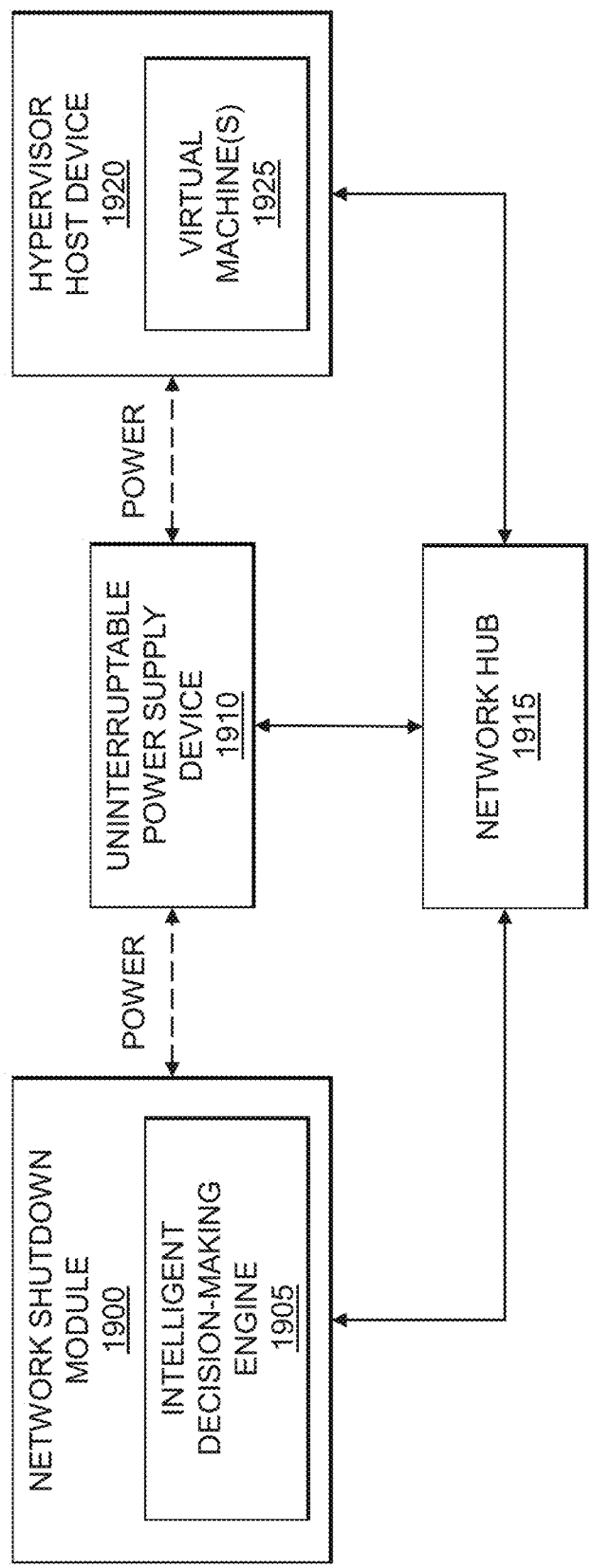
FIG. 19 shows an intelligent decision-making engine implemented in a network shutdown module coupled to uninterruptable power supplies providing power to a hypervisor host device in an illustrative embodiment.

FIG. 19 illustrates another use case scenario, wherein an intelligent decision-making engine 1905 is embedded into a network shutdown module 1900. The network shutdown module 1900 is configured to communicate with one or more UPS devices 1910 and a network hub 1915. The UPS devices 1910 provide power to the network shutdown module 1900 and a hypervisor host device 1920 on which one or more VMs 1925 run. The network shutdown module 1900 is configured to perform shutdown of the VMs 1925 and/or migration of the VMs 1925 to another hypervisor host device (not shown in FIG. 19) in response to critical UPS events. An end-user can select various criteria (e.g., using the prioritization criteria selection interface 1200) on which the intelligent decision-making engine 1905 can perform various operations (e.g., shutdown of the VMs 1925, migration of the VMs 1925 to another hypervisor host device 1920) in a more efficient and intelligently prioritized manner during critical UPS events.

Figure 20B:
FIG. 20B shows a table of criteria utilized for prioritization of virtual machines in the virtual computing environment in an illustrative embodiment.

FIG. 20A illustrates use of an intelligent decision-making engine 2005 embedded on a workflow scheduler 2000 that performs workflow scheduling for a virtual computing environment 2010. The virtual computing environment 2010 is assumed to include a set of virtual computing resources 2015-1, 2015-2, . . . 2015-N (collectively, virtual computing resources 2015). Each set of virtual computing resources (R1, R2, . . . Rn) is implemented using virtual infrastructure (also referred to as virtualization infrastructure) that runs in physical infrastructure. The virtual computing resources may comprise VMs, software containers, etc. FIG. 21, discussed below, provides additional detail regarding a processing platform that implements VMs and/or container sets using virtualization infrastructure running on physical infrastructure. An end-user can select various criteria (e.g., using the prioritization criteria selection interface 1200) on which the intelligent decision-making engine 2005 can perform task scheduling operations (e.g., assignment of tasks to the virtual computing resources 2015). FIG. 20B shows a table 2020 illustrating various criteria that may be used for VM or other virtual computing resource prioritization for task scheduling. Such criteria may include, by way of example, speed (e.g., as measured using millions of instructions per second (MIPS)), cost, etc.

Illustrative embodiments provide a number of advantages relative to conventional approaches, providing solutions for intelligent prioritization of VMs or other virtual computing resources. The prioritization or ranking of VMs or other virtual computing resources in some embodiments is performed based on or utilizing MCDA using a Mahalanobis distance based variance-covariance matrix that takes into account pair-wise correlation between all attributes from the data set to produce the most optimal ranking outcome. Advantageously, various criteria are considered which can impact the final decision making (e.g., ranking or prioritization of VMs or other virtual computing resources), including correlations between VMs or other virtual computing resources, if any. End-users are enabled to select criteria of interest on which VM or other virtual computing resource ranking is performed. The relative closeness of alternatives is calculated to perform a final ranking of VMs or other virtual computing resources. The techniques described herein may be applied to any use case in which it is beneficial to perform or utilize a prioritization or ranking of VMs or other virtual computing resources. The techniques described herein are computationally inexpensive relative to conventional approaches, enabling efficient handling of the correlation between criteria and the efficient handling of multiple criteria in scale as well as correlations between VMs or other virtual computing resources. End-user satisfaction and overall system efficiency is increased, as less manual intervention is required for performing VM or other virtual resource ranking.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for multi-criteria decision analysis for determining prioritization of virtual computing resources for scheduling operations will now be described in greater detail with reference to FIGS. 21 and 22. Although described in the context of system 100, these platforms may also be used to implement at least portions of other information processing systems in other embodiments.

Figure 21:
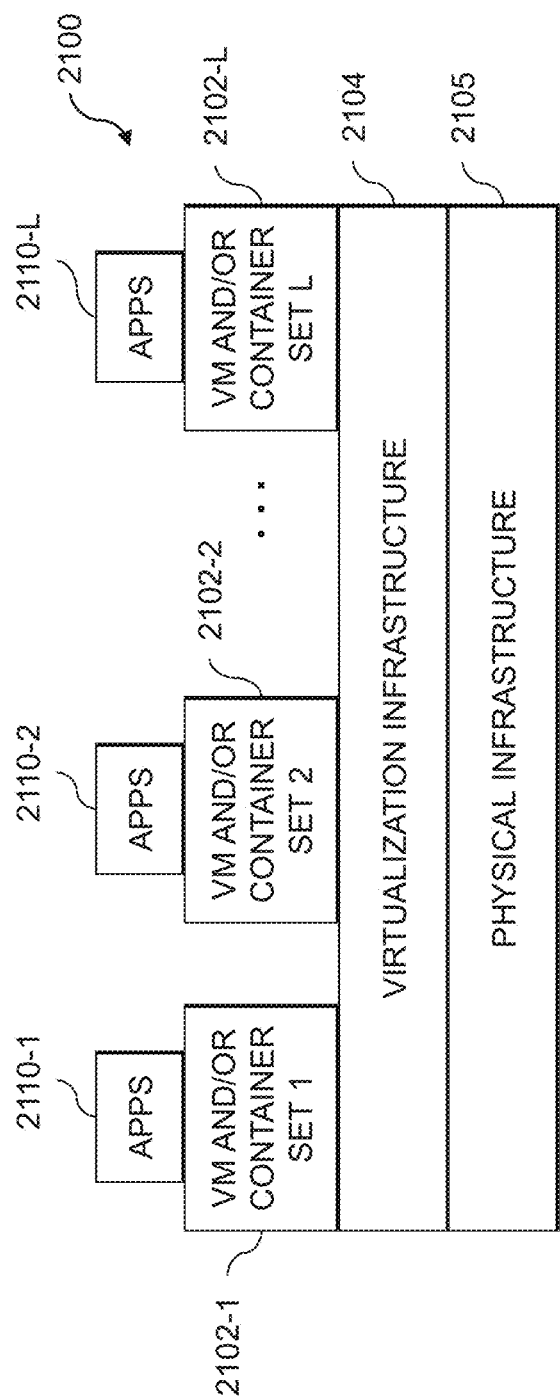
FIGS. 21 and 22 show examples of processing platforms that may be utilized to implement at least a portion of an information processing system in illustrative embodiments.
Figure 22:
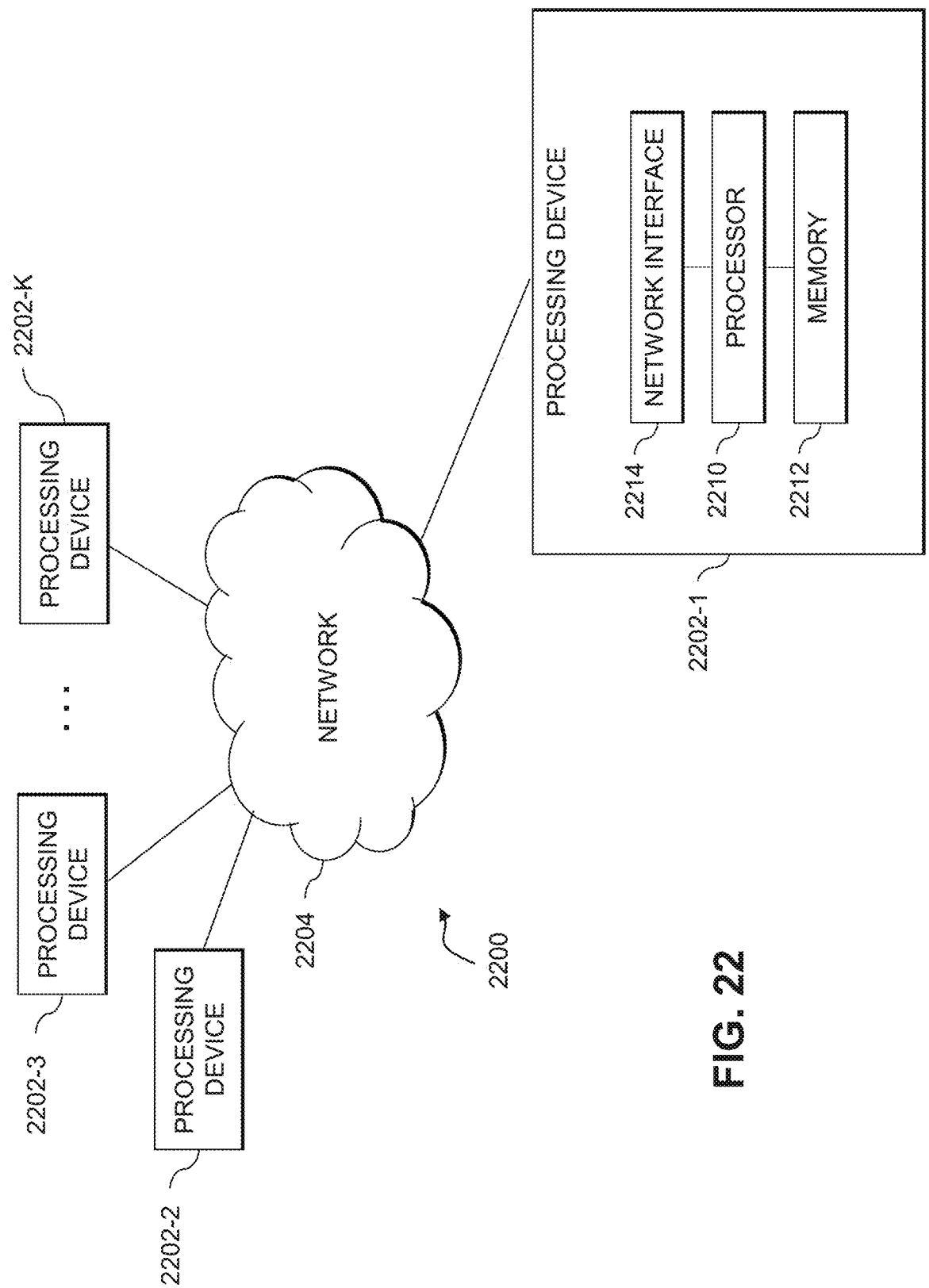

FIG. 21 shows an example processing platform comprising cloud infrastructure 2100. The cloud infrastructure 2100 comprises a combination of physical and virtual processing resources that may be utilized to implement at least a portion of the information processing system 100 in FIG. 1. The cloud infrastructure 2100 comprises multiple virtual machines (VMs) and/or container sets 2102-1, 2102-2, . . . 2102-L implemented using virtualization infrastructure 2104. The virtualization infrastructure 2104 runs on physical infrastructure 2105, and illustratively comprises one or more hypervisors and/or operating system level virtualization infrastructure. The operating system level virtualization infrastructure illustratively comprises kernel control groups of a Linux operating system or other type of operating system.

The cloud infrastructure 2100 further comprises sets of applications 2110-1, 2110-2, . . . 2110-L running on respective ones of the VMs/container sets 2102-1, 2102-2, . . . 2102-L under the control of the virtualization infrastructure 2104. The VMs/container sets 2102 may comprise respective VMs, respective sets of one or more containers, or respective sets of one or more containers running in VMs.

In some implementations of the FIG. 21 embodiment, the VMs/container sets 2102 comprise respective VMs implemented using virtualization infrastructure 2104 that comprises at least one hypervisor. A hypervisor platform may be used to implement a hypervisor within the virtualization infrastructure 2104, where the hypervisor platform has an associated virtual infrastructure management system. The underlying physical machines may comprise one or more distributed processing platforms that include one or more storage systems.

In other implementations of the FIG. 21 embodiment, the VMs/container sets 2102 comprise respective containers implemented using virtualization infrastructure 2104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 2100 shown in FIG. 21 may represent at least a portion of one processing platform. Another example of such a processing platform is processing platform 2200 shown in FIG. 22.

The processing platform 2200 in this embodiment comprises a portion of system 100 and includes a plurality of processing devices, denoted 2202-1, 2202-2, 2202-3, . . . 2202-K, which communicate with one another over a network 2204.

The network 2204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2202-1 in the processing platform 2200 comprises a processor 2210 coupled to a memory 2212.

The processor 2210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 2212 may comprise random access memory (RAM), read-only memory (ROM), flash memory or other types of memory, in any combination. The memory 2212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2202-1 is network interface circuitry 2214, which is used to interface the processing device with the network 2204 and other system components, and may comprise conventional transceivers.

The other processing devices 2202 of the processing platform 2200 are assumed to be configured in a manner similar to that shown for processing device 2202-1 in the figure.

Again, the particular processing platform 2200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for multi-criteria decision analysis for determining prioritization of virtual computing resources for scheduling operations as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, devices, virtual computing resources, prioritization criteria, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      selecting prioritization criteria for a plurality of virtual computing resources;
      determining, for at least one criterion in the selected prioritization criteria, at least one directional correlation between the at least one criterion and at least one other criterion in the selected prioritization criteria;
      generating a prioritization of the plurality of virtual computing resources utilizing a multi-criteria decision analysis algorithm, the multi-criteria decision analysis algorithm being based at least in part on the determined at least one directional correlation; and
      performing one or more scheduling operations for the plurality of virtual computing resources based at least in part on the generated prioritization of the plurality of virtual computing resources.

2. The apparatus of claim 1 wherein determining the at least one directional correlation comprises constructing a weighted decision matrix, wherein each element of the weighted decision matrix comprises a value of a given criterion of the selected prioritization criteria for a given one of the plurality of virtual computing resources multiplied by a weight of the given criterion for the given virtual computing resource.

3. The apparatus of claim 2 wherein the value of the given criterion for the given virtual computing resource comprises a normalized value.

4. The apparatus of claim 2 wherein the given criterion comprises a categorical criterion, and wherein the value of the given criterion for the given virtual computing resource comprises a numeric value obtained by applying a transformation to a categorical value of the categorical criterion.

5. The apparatus of claim 2 wherein the weight of the given criterion for the given virtual computing resource is determined based at least in part on an entropy of the value of the given criterion for the given virtual computing resource.

6. The apparatus of claim 2 wherein determining the at least one directional correlation further comprises constructing a covariance matrix, wherein diagonal element values of the covariance matrix comprise variance measures, and wherein non-diagonal element values of the covariance matrix comprise directional covariance measures.

7. The apparatus of claim 6 wherein determining the at least one directional correlation further comprises:
   determining positive and negative separation measure solutions for each of the plurality of virtual computing resources, the positive and negative separation measure solutions being determined based at least in part utilizing Mahalanobis distance, the weighted decision matrix, and the covariance matrix; and
   determining a relative closeness rating for each of the plurality of virtual computing resources based at least in part on the determined positive and negative separation measure solutions for each of the plurality of virtual computing resources.

8. The apparatus of claim 7 wherein generating the prioritization of the plurality of virtual computing resources comprises sorting the plurality of virtual computing resources based on the determined relative closeness ratings.

9. The apparatus of claim 1 wherein the multi-criteria decision analysis algorithm comprises a Technique for Order of Preference by Similarity to Ideal Solution (TOPIS) algorithm.

10. The apparatus of claim 1 wherein the one or more scheduling operations are performed in response to detecting one or more events.

11. The apparatus of claim 10 wherein detecting the one or more events comprises detecting one or more power interruption events affecting one or more uninterruptable power supply devices associated with physical infrastructure running virtualization infrastructure hosting the plurality of virtual computing resources, and wherein performing the one or more scheduling operations comprises determining an ordering for shutdown of the plurality of virtual computing resources following detection of the one or more power interruption events affecting the one or more uninterruptable power supply devices.

12. The apparatus of claim 10 wherein detecting the one or more events comprises detecting one or more power interruption events affecting a first set of one or more uninterruptable power supply devices associated with first physical infrastructure running first virtualization infrastructure hosting the plurality of virtual computing resources, and wherein performing the one or more scheduling operations comprises determining an ordering for migration of the plurality of virtual computing resources from the first physical infrastructure running the first virtualization infrastructure to second physical infrastructure running second virtualization infrastructure, the second physical infrastructure being associated with a second set of one or more uninterruptable power supply devices different than the first set of one or more uninterruptable power supply devices.

13. The apparatus of claim 10 wherein detecting the one or more events comprises detecting initiation of one or more backup operations for at least one of a virtualization infrastructure hosting the plurality of virtual computing resources and a physical infrastructure on which the virtualization infrastructure runs, and wherein performing the one or more scheduling operations comprises determining an ordering for backing up the plurality of virtual computing resources.

14. The apparatus of claim 10 wherein detecting the one or more events comprises identifying one or more workloads that are to be scheduled, and wherein performing the one or more scheduling operations comprises determining placement of the identified one or more workloads on the plurality of virtual computing resources based at least in part on the prioritization of the plurality of virtual computing resources.

15. A computer program product comprising a non-transitory processor-readable storage medium having stored therein program code of one or more software programs, wherein the program code when executed by at least one processing device causes the at least one processing device to perform steps of:
selecting prioritization criteria for a plurality of virtual computing resources;
determining, for at least one criterion in the selected prioritization criteria, at least one directional correlation between the at least one criterion and at least one other criterion in the selected prioritization criteria;
generating a prioritization of the plurality of virtual computing resources utilizing a multi-criteria decision analysis algorithm, the multi-criteria decision analysis algorithm being based at least in part on the determined at least one directional correlation; and
performing one or more scheduling operations for the plurality of virtual computing resources based at least in part on the generated prioritization of the plurality of virtual computing resources.

16. The computer program product of claim 15 wherein determining the at least one directional correlation comprises:
constructing a weighted decision matrix, wherein each element of the weighted decision matrix comprises a value of a given criterion of the selected prioritization criteria for a given one of the plurality of virtual computing resources multiplied by a weight of the given criterion for the given virtual computing resource;
constructing a covariance matrix, wherein diagonal element values of the covariance matrix comprise variance measures, and wherein non-diagonal element values of the covariance matrix comprise directional covariance measures;
determining positive and negative separation measure solutions for each of the plurality of virtual computing resources, the positive and negative separation measure solutions being determined based at least in part utilizing Mahalanobis distance, the weighted decision matrix, and the covariance matrix; and
determining a relative closeness rating for each of the plurality of virtual computing resources based at least in part on the determined positive and negative separation measure solutions for each of the plurality of virtual computing resources.

17. The computer program product of claim 16 wherein generating the prioritization of the plurality of virtual computing resources comprises sorting the plurality of virtual computing resources based on the determined relative closeness ratings.

18. A method comprising:
selecting prioritization criteria for a plurality of virtual computing resources;
determining, for at least one criterion in the selected prioritization criteria, at least one directional correlation between the at least one criterion and at least one other criterion in the selected prioritization criteria;
generating a prioritization of the plurality of virtual computing resources utilizing a multi-criteria decision analysis algorithm, the multi-criteria decision analysis algorithm being based at least in part on the determined at least one directional correlation; and
performing one or more scheduling operations for the plurality of virtual computing resources based at least in part on the generated prioritization of the plurality of virtual computing resources;
wherein the method is performed by at least one processing device comprising a processor coupled to a memory.

19. The method of claim 18 wherein determining the directional correlations comprises:
constructing a weighted decision matrix, wherein each element of the weighted decision matrix comprises a value of a given criterion of the selected prioritization criteria for a given one of the plurality of virtual computing resources multiplied by a weight of the given criterion for the given virtual computing resource;
constructing a covariance matrix, wherein diagonal element values of the covariance matrix comprise variance measures, and wherein non-diagonal element values of the covariance matrix comprise directional covariance measures;
determining positive and negative separation measure solutions for each of the plurality of virtual computing resources, the positive and negative separation measure solutions being determined based at least in part utilizing Mahalanobis distance, the weighted decision matrix, and the covariance matrix; and
determining a relative closeness rating for each of the plurality of virtual computing resources based at least in part on the determined positive and negative separation measure solutions for each of the plurality of virtual computing resources.

20. The method of claim 19 wherein generating the prioritization of the plurality of virtual computing resources comprises sorting the plurality of virtual computing resources based on the determined relative closeness ratings.

* * * * *